US008601267B2

(12) United States Patent
Lucidarme et al.

(10) Patent No.: US 8,601,267 B2
(45) Date of Patent: Dec. 3, 2013

(54) ESTABLISHING A SECURED COMMUNICATION SESSION

(71) Applicant: Apple Inc, Cupertino, CA (US)

(72) Inventors: Thierry Lucidarme, Montigny le Bretonneux (FR); Jacques Patarin, Versailles (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/647,429

(22) Filed: Oct. 9, 2012

(65) Prior Publication Data

US 2013/0046984 A1 Feb. 21, 2013

Related U.S. Application Data

(63) Continuation of application No. 11/640,547, filed on Dec. 18, 2006, now Pat. No. 8,285,989.

(51) Int. Cl.
*H04L 9/32* (2006.01)
*H04K 1/00* (2006.01)

(52) U.S. Cl.
USPC ............................................ 713/168; 380/28

(58) Field of Classification Search
USPC .................................... 713/168, 171; 380/28
See application file for complete search history.

(56) References Cited

U.S. PATENT DOCUMENTS

| 6,084,969 | A | 7/2000 | Wright et al. |
| 6,148,404 | A | 11/2000 | Yatsukawa |
| 6,230,269 | B1 | 5/2001 | Spies et al. |
| 6,233,565 | B1 | 5/2001 | Lewis et al. |
| 6,236,727 | B1 * | 5/2001 | Ciacelli et al. ................ 380/212 |
| 6,539,479 | B1 | 3/2003 | Wu |
| 6,654,883 | B1 | 11/2003 | Tatebayashi |
| 6,671,810 | B1 | 12/2003 | Jardin |
| 7,193,993 | B2 | 3/2007 | Silvester |
| 7,263,192 | B2 | 8/2007 | Morlang et al. |
| 7,313,234 | B2 * | 12/2007 | Takagaki et al. ................ 380/28 |
| 7,321,971 | B2 | 1/2008 | Wilding et al. |
| 7,430,761 | B2 | 9/2008 | Fujita et al. |
| 7,447,903 | B2 | 11/2008 | Sandhu et al. |
| 7,591,012 | B2 | 9/2009 | Jaganathan et al. |
| 7,644,272 | B2 | 1/2010 | Frank et al. |
| 7,664,954 | B2 | 2/2010 | Ogawa et al. |
| 7,889,852 | B2 | 2/2011 | Whitehead |

(Continued)

OTHER PUBLICATIONS

RL. Rivest et al., "A Method for Obtaining Digital Signatures and Public-Key Cryptosystems," pp. 120-127, Feb. 1978.

(Continued)

*Primary Examiner* — Techane Gergiso
(74) *Attorney, Agent, or Firm* — Meyertons, Hood, Kivlin, Kowert & Goetzel, P.C.

(57) ABSTRACT

The present invention relates to a method for establishing a secured communication session in a communication system between a user using an untrusted device and a server. According to the present invention the user first obtains an authentication algorithm and an encryption algorithm and then creates a session key. Next the user obtains a public key of the server and sends a personal identity number to the server for authentication by using the authentication algorithm, the personal identity number being encrypted by using the encryption algorithm and the public key of the server. The user also sends the session key to the server for encrypting purpose between the user and the server, the session key being encrypted by using the encryption algorithm and the public key of the server.

50 Claims, 2 Drawing Sheets

(56) References Cited

U.S. PATENT DOCUMENTS

| | | |
|---|---|---|
| 2002/0087860 A1* | 7/2002 | Kravitz .................. 713/168 |
| 2004/0136533 A1* | 7/2004 | Takagaki et al. ............ 380/255 |
| 2004/0260950 A1* | 12/2004 | Ougi et al. .................. 713/201 |
| 2005/0154889 A1 | 7/2005 | Ashley et al. |
| 2005/0198490 A1* | 9/2005 | Jaganathan et al. .......... 713/151 |
| 2005/0223228 A1* | 10/2005 | Ogawa et al. ............... 713/168 |
| 2006/0294366 A1 | 12/2006 | Nadalin et al. |
| 2007/0180227 A1* | 8/2007 | Akimoto .................. 713/153 |
| 2008/0065878 A1 | 3/2008 | Hutson et al. |
| 2008/0098212 A1 | 4/2008 | Helms et al. |

OTHER PUBLICATIONS

Federal Information Processing Standards Publication 197, "Advanced Encryption Standard (AES)," pp. i-47, Nov. 26, 2001.

Federal Information Processing Standards Publication 180-2, "Secure Hash Standard," pp. i-71, Aug. 1, 2002.

* cited by examiner

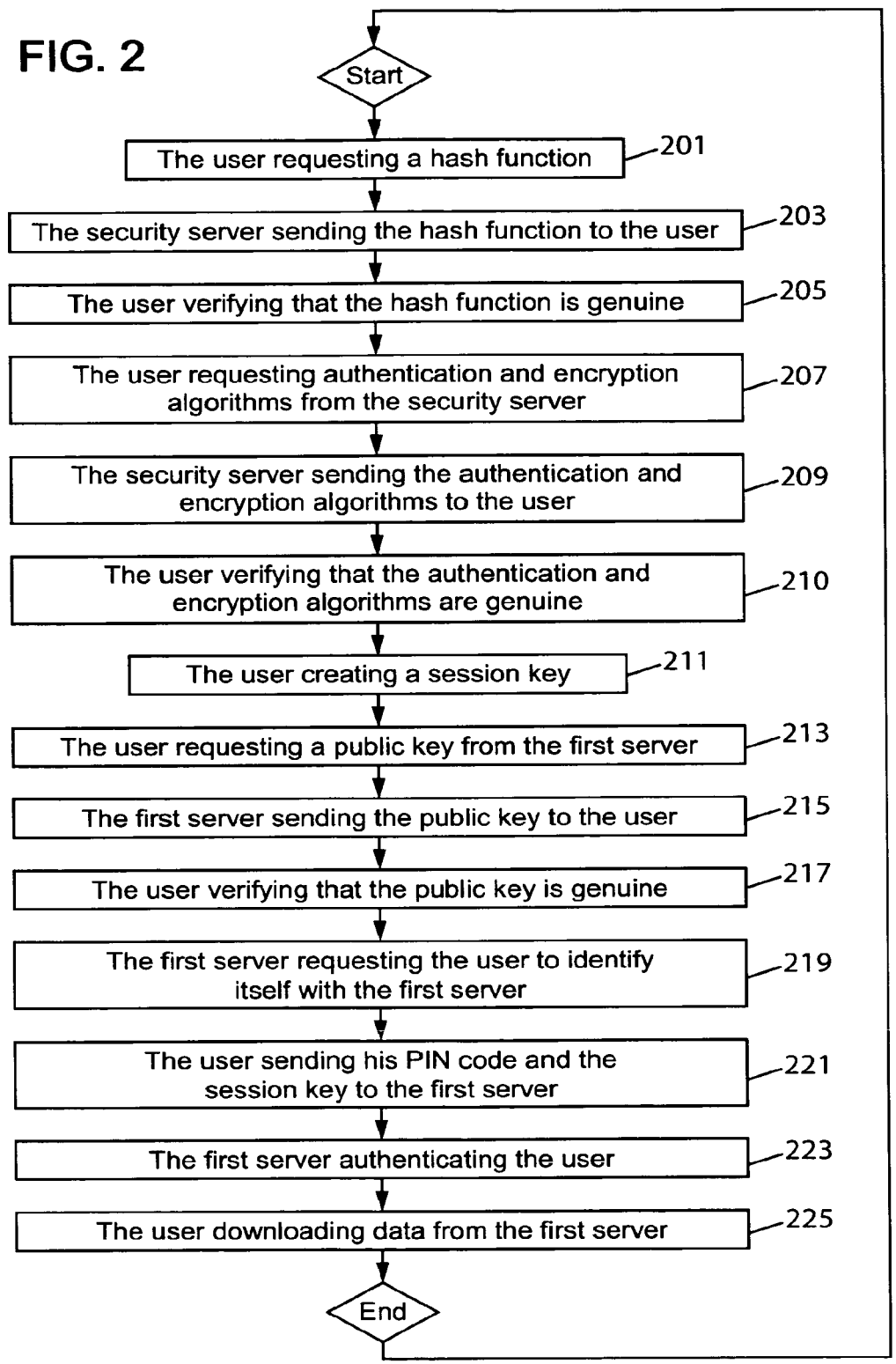

ESTABLISHING A SECURED COMMUNICATION SESSION

PRIORITY CLAIM

This application is a continuation application of U.S. patent application Ser. No. 11/640,547, titled "Establishing a Secured Communication Session", filed on Dec. 18, 2006, which is hereby incorporated by reference in its entirety as though fully and completely set forth herein.

FIELD OF THE INVENTION

The present invention relates to a method for establishing a secured communication session in a communication system. More specifically, the invention relates to a situation in which a user establishes a secured communication session with a remote server.

BACKGROUND OF THE INVENTION

Security issues are important in communication systems. It is currently known to use authentication and encryption algorithms to improve security of communication systems. These mechanisms generally imply that the user uses a computer device storing corresponding algorithms and keys.

It would be desirable for a user to have a secured communication session even when the user does not hold a computer device storing all the necessary security algorithms and keys. It may be the case for instance when the user is traveling and can only use unknown and untrusted computer devices, such as personal computers (PCs), for instance in a cyber cafe.

The problem of establishing a secured communication is especially challenging when, for instance a user has to use a public, untrusted PC to access a remote server and download some confidential information from that remote server. In this case not only the user has to be reliably authenticated but also the information downloaded from the server should be reliably encrypted.

The user may hold a storage device with limited memory such as a universal serial bus (USB) key or a chip card, capable of storing some sensitive information relating to security. But in other cases the user may have no personal device at all.

The invention proposes a way of allowing a secured communication session in such situations.

SUMMARY OF THE INVENTION

One object of the invention is to overcome the above-identified deficiencies. More specifically, a new method for establishing a secured communication session between an untrusted device and a remote server has been invented.

According to a first aspect of the invention there is proposed a method for establishing a secured communication session in a communication system between a user using an untrusted device and a server, the method comprises the user performed steps of:
  obtaining an authentication algorithm and an encryption algorithm;
  creating a session key;
  obtaining a public key of the server;
  sending a personal identity number to the server for authentication by using the authentication algorithm, the personal identity number being encrypted by using the encryption algorithm and the public key of the server; and
  sending the session key to the server for encrypting purpose between the user and the server, the session key being encrypted by using the encryption algorithm and the public key of the server.

The invention in accordance with an embodiment of the invention has the advantage that the user can establish a secured communication session with the server even if it is using an untrusted device. Furthermore, the user is also aware that it has been safely authenticated and that the encryption is reliable.

According to a second aspect of the invention, there is proposed a computer program product comprising instructions for establishing a secured communication session in a communication system between a user using an untrusted device and a server, the computer program product comprises instructions for:
  obtaining an authentication algorithm and an encryption algorithm;
  creating a session key;
  obtaining a public key of the server;
  sending a personal identity number to the server for authentication by using the authentication algorithm, the personal identity number being encrypted by using the encryption algorithm and the public key of the server; and
  sending the session key to the server for encrypting purpose between the user and the server, the session key being encrypted by using the encryption algorithm and the public key of the server.

According to a third aspect of the invention there is proposed an apparatus for establishing a secured communication session in a communication system between a user using the apparatus and a server, the apparatus comprises means for:
  obtaining an authentication algorithm and an encryption algorithm;
  creating a session key;
  obtaining a public key of the server;
  sending a personal identity number to the server for authentication by using the authentication algorithm, the personal identity number being encrypted by using the encryption algorithm and the public key of the server; and
  sending the session key to the server for encrypting purpose between the user and the server, the session key being encrypted by using the encryption algorithm and the public key of the server.

Other aspects of the invention are recited in the claims appended hereto.

BRIEF DESCRIPTION OF THE DRAWINGS

Other features and advantages of the invention will become apparent from the following description of non-limiting exemplary embodiments, with reference to the appended drawings, in which:

FIG. 2 is a flow chart illustrating a method in accordance with an embodiment of the present invention.

DETAILED DESCRIPTION OF EMBODIMENTS OF THE INVENTION

Figure 1:
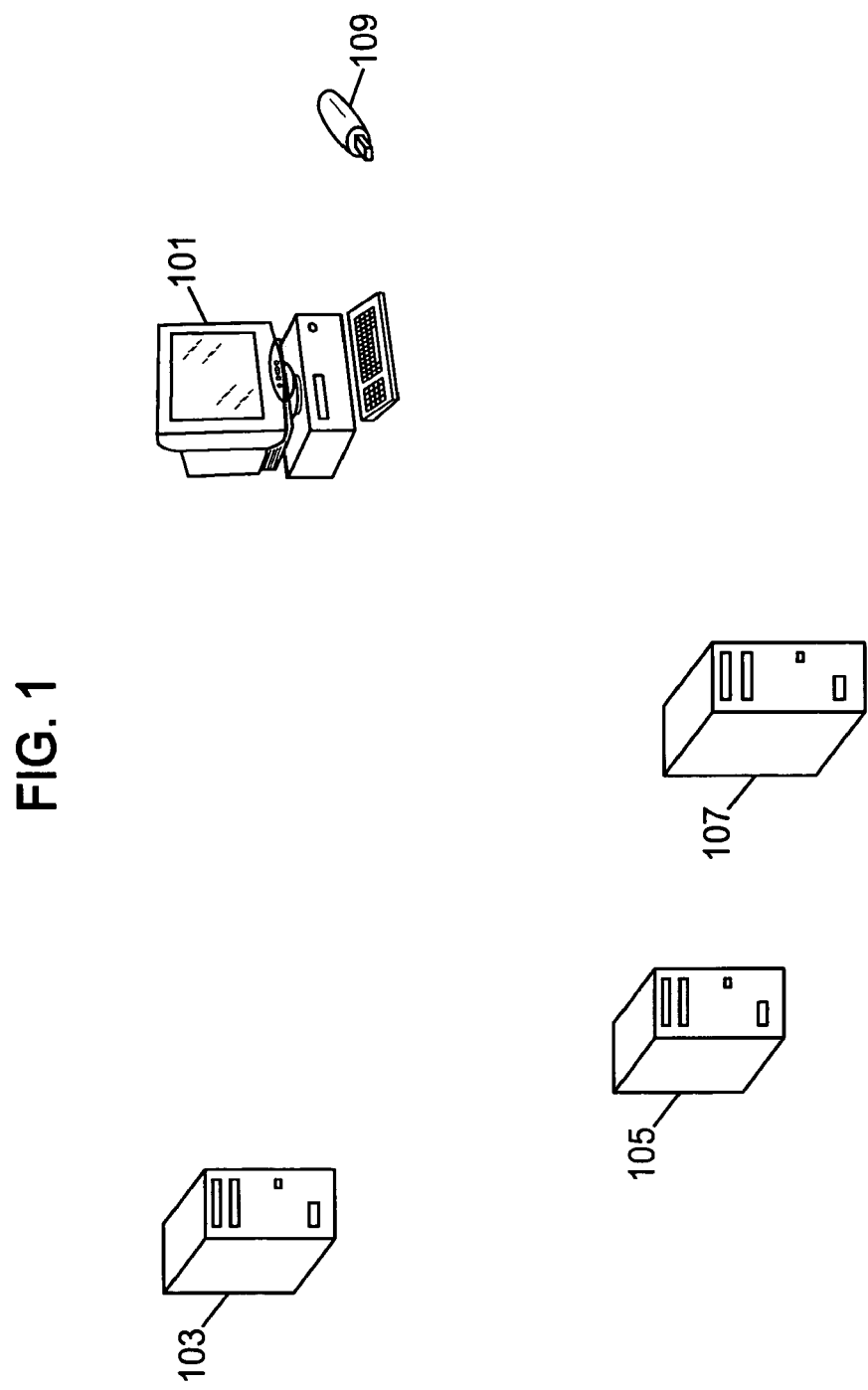
FIG. 1 is a schematic representation of a communication system where the embodiments of the invention can be applied.

Some embodiments of the invention will next be described with reference to FIGS. 1 and 2. It is to be noted that the following exemplary embodiments are only illustrative and many alterations in the described embodiments are possible.

In FIG. 1 there is shown a communication system comprising a computer device 101, in this case an untrusted PC 101, a first server 103, a second server 105, a third server 107 and an auxiliary device 109, in this case a USB key 109. For simplicity only these devices are depicted in FIG. 1, but it is to be noted that the communication system may equally contain other computer devices and servers. In this example the PC 101 and the servers 103, 105 and 107 are connected to each other by using a cable connection but any suitable wireless communication standard could equally be used to transfer data between these devices. Examples of such wireless standards are global system for mobile communications (GSM) or universal mobile telecommunication system (UMTS) or any other current or future standard. In this example the devices of FIG. 1 are also connected the Internet.

The auxiliary device 109 is in the following description a USB key 109, but it could equally be any other device capable of storing data and which can be connected to the PC 101. The USB key 109 is not needed in the first embodiment of the invention but its purpose is explained in connection with the second embodiment of the invention.

The communication between the communication system devices is based on layered network protocols defined by open systems interconnection reference model (OSI reference model or OSI model for short) and implements at least the lowest three layers, i.e. Layers 1, 2 and 3. Layer 1 is the physical layer, Layer 2 is the data link layer and Layer 3 is the network layer. Furthermore, the terminals are associated with their Layer 2 and Layer 3 addresses. In the following examples the Layer 3 address is an internet protocol (IP) address, whereas the Layer 2 address is a medium access control (MAC) address. However, it is to be noted that these Layer 2 and 3 addresses could be other addresses than the MAC and IP addresses, respectively. The MAC address is a unique identifier attached to most networking equipments. The IP address is a unique number that network devices use in order to identify and communicate with each other in a network utilizing the IP standard.

The IP addresses of the network devices can be either static or dynamic. If the addresses are dynamic, in the network there is also need for a dynamic host configuration protocol (DHCP) server (not shown in FIG. 1). Also missing in FIG. 1 is a domain name system (DNS) server. The purpose of the DHCP server is to allocate unique IP addresses to network devices in case of dynamic network addresses. The assignment of the IP address usually expires after a predetermined period of time, at which point the network devices and the DHCP server renegotiate a new address from the server's predefined pool of addresses. It is to be noted that in case of static IP addresses in the network, the DHCP server is no longer needed.

The purpose of the DNS server is to make it possible to attach easy-to-remember domain names or symbolic addresses, such as "google.com" to hard-to-remember IP addresses, such as 10.200.300.400. In case of a large network, several DNS servers may be needed that interact with each other.

In the following description the second server 105 is called a security server 105, since in accordance with the first embodiment of the invention, it is arranged to contain at least one authentication algorithm, at least one encryption algorithm and at least one function that can be used to verify the authenticity or correctness of the above mentioned algorithms. An example of such a function is a hash function, which can be any member of the secure hash algorithm (SHA) family. Federal Information Processing Standards Publication (FIPS PUB) 180-2 "Secure Hash Standard" describes the secure hash algorithm in more detail. A hash function is a reproducible method of turning data, such as a message or a file, into a number suitable to be handled by a computer device. A hash function provides a way of creating a small digital "fingerprint" from any kind of data. These functions chop and mix, i.e. substitute and transpose, the data to create the fingerprint often called a hash value. The hash value is represented as a short string of random-looking letters and numbers. In the described embodiments of the invention SHA-256 is used as a hash function, but any other suitable function could be used instead.

An example of an authentication and encryption algorithm that can be employed in the embodiments of the invention is an RSA algorithm. RSA can be used both for authentication and encryption. RSA involves a public key and a private key. The public key can be known to everybody and is used in the encryption process. The encrypted message can only be decrypted by using the private key. An article entitled "A method for obtaining digital signatures and public-key cryptosystems" by R. L. Rivest, A. Shamir and L. Adleman, Comm. ACM 21 (1978), p. 120-126 describes the RSA algorithm in more detail.

Other examples of the authentication algorithms that could be employed in the embodiments of the invention are ElGamal, Schnorr, Rabin or GPS. In the described embodiments of the invention RSA is used as an authentication algorithm, but the invention is by no means limited to the use of this specific algorithm.

RSA operates as follows, for an authentication of B with A. B holds a private key d, such that ed=1 mod f, where e is a random integer (e.g. e=3), f=(p−1)(q−1) and p and q are two large distinct random primes. Both A and B hold a public key (n,e), where n=pq. B, who is the prover in this case, generates a signature $s=m^d$ mod n of a message m. B transmits s to A. A, as the verifier, checks B's signature s on m, by computing $s^e$ mod n. If $s^e$ mod n equals m, B is authenticated successfully.

The interaction between A and B may be secured in one direction only. But it could be secured in both directions as well by using the respective above mentioned algorithms. This situation relates to a mutual authentication case.

It is reminded that RSA operates as follows, for encryption by A and decryption by B. B holds a private key d, such that ed=1 mod f, where e is a random integer (e.g. e=3), f=(p−1)(q−1) and p and q are two large distinct random primes. Both A and B hold a public key (n,e), where n=pq. A encrypts a message m by computing $c=m^e$ mod n. A transmits the ciphertext c to B. B must calculate $c^d$ mod n, in order to recover m.

Other examples of the encryption algorithms are data encryption standard (DES) and advanced encryption standard (AES). Currently AES is one of the most popular algorithms used in symmetric key cryptography. Federal Information Processing Standards Publication (FIPS PUB) 197 "Advanced Encryption Standard" describes the AES in more detail. AES is a substitution-permutation network and it is relatively easy to implement, and requires little memory. AES operates on a 4×4 array of bytes, termed the state. AES uses a fixed block size of 128 bits and a key size of 128, 192 or 256 bits. For encryption, each round of AES, except the last round, consists of four stages:

1. AddRoundKey—each byte of the state is combined with the round key and each round key is derived from the cipher key using a key schedule.

2. SubBytes—a non-linear substitution step, where each byte is replaced with another according to a lookup table.

3. ShiftRows—a transposition step, where each row of the state is shifted cyclically a certain number of steps.

4. MixColumns—a mixing operation which operates on the columns of the state combining the four bytes in each column using a linear transformation.

Modern encryption methods can be divided into symmetric key algorithms, also known as private-key cryptography, and asymmetric key algorithms also known as public-key cryptography. In a symmetric key algorithm, e.g. DES and AES, the sender and receiver must have a shared key set up in advance and kept secret from all other parties. The sender then uses this key for encryption, and the receiver uses the same key for decryption. In an asymmetric key algorithm, e.g., RSA, there are two separate keys: a public key is published and enables any sender to perform encryption, while a private key is kept secret by the receiver and enables only him to perform decryption.

In FIG. 1, there is also shown a third server 107, which is controlled by a trusted authority so that the information sent by the third server 107 is reliable. The purpose of the third server is to co-operate with the first server 103 and with the PC 101. The exact operation of this server will be explained later. It is to be noted that depending on the implementation details of the embodiments of the invention, the third server 107 may not be needed at all.

Next a first embodiment of the invention will be described in more detail with reference to FIG. 1 and the flow chart of FIG. 2.

In the first embodiment it is assumed that a user of the PC 101 wants to establish a secured communication session with the first server 103 and intends to download data from that server in a secured way. Furthermore, in this embodiment the user does not possess any extra devices such as a USB key 109 to help in setting up the communication session. Also, as already stated, the PC 101 can be considered as an untrusted device for the user, since the user does not know whether software on that PC 101 is reliable and trustworthy. The user can for instance be traveling abroad and the PC 101 is a public device located for instance in a cyber cafe. In this embodiment the user can establish a secured communication session from scratch. The user only has to know one personal identity number and few more numbers and/or letters to obtain a good level of security.

In this example the PC 101 does not contain any security algorithms and thus, they need to be downloaded from another device, such as the security server 105. Even if the PC 101 contains the security algorithms, they would still need to be downloaded or at least verified since the PC 101 is considered as an untrusted device. The user only needs to know how to locate the security server 105. In this example the user locates the security 105 server based on the IP address of the security server 105. Accordingly, in step 201 the user sends a request to the security server 105 to download the SHA-256 function and in step 203 the security server 103 responds by sending the SHA-256 function to the user.

When the user has received the hash function, it verifies in step 205 that the downloaded hash function is authentic or genuine and that it is not an algorithm sent by a hostile device. This can be done by the user first verifying the length of the downloaded SHA-256 code. If the length of the code is what was expected then the user can run the SHA-256 function on a specific word, such as "Muriel". Any word can be chosen as long as the user knows at least part of the result of the hash value for the chosen word. The user can for instance verify that three bytes of the obtained hash value give a correct answer. The bytes to be verified can for instance be the bytes 2, 8 and 20. Any bytes can be checked as long as the user knows the correct answer. If more than three bytes are verified, the reliability of the verification can be increased. The only constraint is the capacity of the memory of the user. It is of course possible to write the correct hash value on a piece of paper or to save it in a more secured place. For instance, several mobile phones offer a possibility to save confidential information secured by a secret code.

If the verification is not successful, then the user can reject the hash function or alternatively the user can perform a new verification of the same hash function using a different word. The user can also connect to several security servers and request a specific hash function and then compare the obtained hash values by running the hash functions obtained from different servers on the same word. If the hash values correspond to each other, then it can be believed that the downloaded hash function is indeed genuine.

Next in step 207 the user requests the authentication and encryption algorithms from the security server 105. If the security server 105 contains several authentication or encryption algorithms, then the user can be given a choice which algorithm he prefers. In this embodiment the user wants to download the RSA algorithm for authentication purposes and the AES algorithm for encryption purposes. Then in step 209 the security server 105 sends the RSA and AES algorithms to the user. It is also possible that the security algorithms are downloaded from several servers and then the obtained algorithms can be compared to find out whether the obtained algorithms are genuine.

When the user has received the requested security algorithms RSA and AES, then he can verify in step 210 that these algorithms are genuine. The verification can be done following the same principle as when verifying the hash function in step 205. But of course now the hash function is run on the security algorithms RSA and AES and not on a specific word. Again the user needs to know at least part of the correct answer in order to be able to deduct whether the received algorithms are genuine.

Next in step 211 the user generates a secret AES session key $K_{AES}$. One way of doing this is that the AES algorithm requests the user to randomly strike the keys of the keyboard of the PC 101. The time between each strike is then used to create the secret session key $K_{AES}$. In this example the program has to make sure that sufficient number of keystrokes are obtained so that at least $2^{80}$ different possibilities exist to create the secret session key $K_{AES}$.

As mentioned earlier, AES is a symmetric encryption algorithm. However, it would also be possible to use the asymmetric RSA algorithm for encryption. In this case the AES algorithm would not be needed. If RSA is used for authentication and encryption, then instead of generating the secret session key $K_{AES}$, two RSA keys would have to be generated: a secret session key $K_{RSApriv}$ and a public session key $K_{RSApub}$. In this case $K_{RSApub}$ would be used for encrypting the data and $K_{RSApriv}$ would be used for data decryption.

Then in step 213 the user requests a public RSA session key $K_{RSApub}$ from the first server 103. The public RSA session key $K_{RSApub}$ of the first server 103 is used when establishing the secured session in the encryption process. Once the secured session is established, the secret AES session key $K_{AES}$ is used in the encryption process when the user downloads data from the first server 103. This will be explained in more detail later in this paper. Next in step 215 the first server 103 sends $K_{RSApub}$, i.e. (n,e) to the user. Then the user verifies in step 217 that $K_{RSApub}$ is genuine by running the hash function on this key thereby following the same principles as described above.

Alternatively, instead of running the hash function on $K_{RSApub}$ from the first server 103, the first server 103 can send a certificate to the user, the certificate being signed by a network element controlled by a trusted authority. In this example the third server 107 is used for signing the certificate. For this purpose the first server 103 and the third server 107 are arranged to be able to communicate with each other. In this example the first server 103 sends the certificate to the third server 107 for signing. The third server verifies the correctness of the certificate, signs it and sends it back to the first server 103. Then this certificate is sent to the user who then verifies the certificate by using a public key of the authority. The user may already know the public key of the authority or it may be downloaded from the third server 107 or from another suitable server. The user can then verify by using the SHA-256 function that the public key of the authority is genuine. The certificate received from the first server 103 comprises $K_{RSApub}$ of the first server 103, an identity of the first server 103 and a hash value that it has calculated when running the hash function on $K_{RSApub}$.

Next the first server 103 requests in step 219 the user to identify itself with the first server 103 by requesting the user to enter his personal identity number (PIN). The user then types by using the keyboard of the PC 101 the PIN code that he has memorized. Then in step 221 this PIN code is sent to the first server 103. The first server 103 can now authenticate the user by using the authentication algorithm and the PIN code. The PIN code can be sent together with the secret session key $K_{AES}$ and an email address so that secret session key $K_{AES}$ is encrypted by using the encryption algorithm and $K_{RSApub}$. Accordingly a data set to be sent to the first server can be (PIN/$K_{AES}$/email address)$^e$ mod n. In this way every request from the user can be identified by attaching the PIN code to the request to be sent to the first server 103. The secret session key $K_{AES}$ could also be sent to the first server separate from the PIN code in a different message. Once the first server 103 knows the secret session key $K_{AES}$, this key can be used for encrypting data instead of $K_{RSApub}$.

Next in step 223, the first server 103 authenticates the user by verifying that the PIN code entered by the user is correct. If however, the PIN code is not correct, the first server 103 requests the user to give a new PIN code and if, for instance, after three attempts the PIN code is still not correct, the first server 103 blocks the data for that particular user.

Then finally in step 225 the user can start downloading data from the server. Now the downloaded data is encrypted by the encryption algorithm, in this example AES, by using the secret session key $K_{AES}$. The same key can then be used for decrypting the data. However, if the RSA algorithm was used for encrypting the data, then $K_{RSApub}$ is used for data encryption and $K_{RSApriv}$ for data decryption.

Above the first embodiment of the invention was described. The second embodiment will be described next. In the second embodiment, the user possesses an auxiliary device, such as a USB key 109. The USB key 109 can be used to save some information useful for establishing the secured communication session with the first server 103. In this example the USB key 109 contains the hash function, such as the SHA-256, the authentication and the encryption algorithms, in this example RSA and AES algorithms, respectively. Alternatively or in addition, the USB key 109 may also contain a result of the hash function calculation for the public key of the first server 103.

Now there is no need to download the security algorithms or the hash function from the security server, since the user already has them on his USB key 109. The procedure thus follows the steps 211-225 described above.

However, if the user has a doubt that the authentication and encryption algorithms on his card might have been tampered, then he might prefer to download new security algorithms. Then the user should download these algorithms from the security server 105 as described above in steps 207 and 209.

In case the USB key 109 also contains the public key of the first server 103, then the steps 213, 215 and 217 would not be needed.

The invention also relates to the corresponding computer program product that is capable of implementing the method in accordance with the embodiments of the invention when loaded and run on computer means of the system. Since majority of the above mentioned steps are performed by the PC 101, this program could be running on that PC.

The invention also relates to a corresponding apparatus, which in the above embodiments is the PC 101 that is arranged to communicate with the servers and is arranged to perform the above mentioned method steps.

Above the invention was illustrated and described in detail in the drawings and foregoing description, such illustration and description are to be considered illustrative or exemplary and not restrictive; the invention is not restricted to the disclosed embodiments. For instance, it is possible that the user does not verify that the security algorithms are genuine. Thus, the user does not necessary have to use any hash functions. It is to be noted that the only steps the user has to perform to establish a secured communication session are the following steps:

obtaining an authentication algorithm and an encryption algorithm;

creating a session key;

obtaining a public key of the server;

sending a personal identity number to the server for authentication by using the authentication algorithm, the personal identity number being encrypted by using the encryption algorithm and the public key of the server; and sending the session key to the server for encrypting purpose between the user and the server, the session key being encrypted by using the encryption algorithm and the public key of the server.

Thus, all the other steps are optional and their presence depends on implementation details and on the security level sought.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously used.

The invention claimed is:

1. A method for establishing a secured communication session between a user using an untrusted device and a server, the method comprising:

the untrusted device receiving first user input to obtain an authentication algorithm and an encryption algorithm for establishing a communication session with the server, wherein said receiving the first user input is performed prior to authentication with the server, and wherein prior to the user input, the untrusted device did not store the authentication algorithm and the encryption algorithm;

in response to the first user input, the untrusted device obtaining the authentication algorithm and the encryption algorithm prior to authentication with the server;

the untrusted device creating a session key prior to authentication with the server;

the untrusted device obtaining a public key of the server prior to authentication with the server;

the untrusted device receiving second user input specifying a personal identity number for performing authentication with the server;

in response to the second user input, the untrusted device sending the personal identity number to the server for authentication by using the authentication algorithm, the personal identity number being encrypted by using the encryption algorithm and the public key of the server; and the untrusted device sending the session key to the server for encrypting purpose between the untrusted device and the server, the session key being encrypted by using the encryption algorithm and the public key of the server.

2. The method according to claim 1, wherein the authentication and encryption algorithms are obtained from a second server.

3. The method according to claim 1, wherein the personal identification number and the session key are sent to the server in the same message.

4. The method according to claim 1, wherein the authentication and encryption algorithms are obtained from a universal serial bus key or from a chip card capable of being connected to the device.

5. The method according to claim 1, wherein the public key of the server is obtained from the server and it is signed by an authority.

6. The method according to claim 5, wherein the authenticity of the signature is verified by using a public key of the authority.

7. The method according to claim 1, wherein the public key of the server is obtained from a universal serial bus key or from a chip card capable of being connected to the device.

8. The method according to claim 1, wherein the method further comprises obtaining a hash function.

9. The method according to claim 8, wherein the hash function is obtained from a second server.

10. The method according to claim 8, wherein the hash function is obtained from a universal serial bus key or from a chip card capable of being connected to the device.

11. The method according to claim 8, wherein the method further comprises verifying authenticity of the hash function by running the hash function on a specific word and comparing at least part of the obtained result to an answer known by the user or stored on a universal serial bus key or on a chip card.

12. The method according to claim 8, wherein the method further comprises verifying authenticity of the authentication and encryption algorithms by running the hash function on these algorithms and comparing at least part of the obtained result to an answer known by the user or stored on a universal serial bus key or on a chip card.

13. The method according to claim 1, wherein the authentication algorithm is the same as the encryption algorithm.

14. The method according to claim 1, wherein the authentication algorithm is an asymmetric key algorithm and the encryption algorithm is a symmetric key algorithm.

15. The method according to claim 1, wherein the method further comprises:

downloading data from the server, the data being encrypted by using the session key and the encryption algorithm.

16. The method according to claim 1, wherein the server is configured to decrypt the personal identity number and the session key and verifying the authenticity of the personal identity number.

17. The method according to claim 16, wherein the server is configured to block the user after having decrypted three false personal identity numbers from the user.

18. The method of claim 1, further comprising:

the untrusted device receiving additional user input for establishing the secured communication session with the server;

wherein said creating the session key and said obtaining the public key is performed in response to the additional user input.

19. A non-transitory, computer accessible memory medium storing program instructions for establishing a secured communication session between a user using an untrusted device and a server, wherein the program instructions are executable by a processor to:

receive first user input to obtain an authentication algorithm and an encryption algorithm for establishing a communication session with the server, wherein said receiving the first user input is performed prior to authentication with the server, and wherein prior to the user input, the untrusted device did not store the authentication algorithm and the encryption algorithm;

in response to the first user input, obtain an authentication algorithm and an encryption algorithm prior to authentication with the server;

create a session key prior to authentication with the server;

obtain a public key of the server prior to authentication with the server;

receive second user input specifying a personal identity number for performing authentication with the server;

in response to the second user input, send the personal identity number to the server for authentication by using the authentication algorithm, the personal identity number being encrypted by using the encryption algorithm and the public key of the server; and send the session key to the server for encrypting purpose between the untrusted device and the server, the session key being encrypted by using the encryption algorithm and the public key of the server.

20. The non-transitory computer accessible memory medium according to claim 19, wherein the authentication and encryption algorithms are obtained from a second server.

21. The non-transitory computer accessible memory medium to claim 19, wherein the personal identification number and the session key are sent to the server in the same message.

22. The non-transitory computer accessible memory medium according to claim 19, wherein the authentication and encryption algorithms are obtained from a universal serial bus key or from a chip card capable of being connected to the device.

23. The non-transitory computer accessible memory medium according to claim 19, wherein the public key of the server is obtained from the server and it is signed by an authority.

24. The non-transitory computer accessible memory medium according to claim 23, wherein the authenticity of the signature is verified by using a public key of the authority.

25. The non-transitory computer accessible memory medium according to claim 19, wherein the public key of the server is obtained from a universal serial bus key or from a chip card capable of being connected to the device.

26. The non-transitory computer accessible memory medium according to claim 19, wherein the program instructions are further executable to obtain a hash function.

27. The non-transitory computer accessible memory medium according to claim 26, wherein the hash function is obtained from a second server.

28. The non-transitory computer accessible memory medium according to claim 26, wherein the hash function is obtained from a universal serial bus key or from a chip card capable of being connected to the device.

29. The non-transitory computer accessible memory medium according to claim 26, wherein the program instructions are further executable to verify authenticity of the hash function by running the hash function on a specific word and comparing at least part of the obtained result to an answer known by the user or stored on a universal serial bus key or on a chip card.

30. The non-transitory computer accessible memory medium according to claim 26, wherein the program instructions are further executable to verify authenticity of the authentication and encryption algorithms by running the hash function on these algorithms and comparing at least part of the obtained result to an answer known by the user or stored on a universal serial bus key or on a chip card.

31. The non-transitory computer accessible memory medium according to claim 19, wherein the authentication algorithm is the same as the encryption algorithm.

32. The non-transitory computer accessible memory medium according to claim 19, wherein the authentication algorithm is an asymmetric key algorithm and the encryption algorithm is a symmetric key algorithm.

33. The non-transitory computer accessible memory medium according to claim 19, wherein the program instructions are further executable to download data from the server, the data being encrypted by using the session key and the encryption algorithm.

34. The non-transitory, computer accessible memory medium of claim 19, wherein the program instructions are further executable to:
 receive additional user input for establishing the secured communication session with the server;
 wherein said creating the session key and said obtaining the public key is performed in response to the additional user input.

35. An apparatus comprising:
 processing hardware;
 an input coupled to the processing logic, wherein the input is configured to receive user input from a user; and
 a transmitter/receiver coupled to the processing logic for establishing a secured communication session with a server;
 wherein the processing hardware is configured to:
  receive first user input to obtain an authentication algorithm and an encryption algorithm for establishing a communication session with the server via the input, wherein said receiving the first user input is performed prior to authentication with the server, and wherein prior to the user input, the apparatus did not store the authentication algorithm and the encryption algorithm;
  in response to the first user input, obtain an authentication algorithm and an encryption algorithm prior to authentication with the server;
  create a session key prior to authentication with the server;
  obtain a public key of the server prior to authentication with the server;
  receive third user input specifying a personal identity number for performing authentication with the server;
  in response to the third user input, send the personal identity number to the server for authentication by using the authentication algorithm, the personal identity number being encrypted by using the encryption algorithm and the public key of the server; and
  send the session key to the server for encrypting purpose between the apparatus and the server, the session key being encrypted by using the encryption algorithm and the public key of the server.

36. The apparatus according to claim 35, wherein the authentication and encryption algorithms are obtained from a second server.

37. The apparatus according to claim 35, wherein the personal identification number and the session key are sent to the server in the same message.

38. The apparatus according to claim 35, wherein the authentication and encryption algorithms are obtained from a universal serial bus key or from a chip card capable of being connected to the device.

39. The apparatus according to claim 35, wherein the public key of the server is obtained from the server and it is signed by an authority.

40. The apparatus according to claim 39, wherein the authenticity of the signature is verified by using a public key of the authority.

41. The apparatus according to claim 35, wherein the public key of the server is obtained from a universal serial bus key or from a chip card capable of being connected to the device.

42. The apparatus according to claim 35, wherein the wherein the processing hardware is further configured to obtain a hash function.

43. The apparatus according to claim 42, wherein the hash function is obtained from a second server.

44. The apparatus according to claim 42, wherein the hash function is obtained from a universal serial bus key or from a chip card capable of being connected to the device.

45. The apparatus according to claim 42, wherein the processing hardware is further configured to verify authenticity of the hash function by running the hash function on a specific word and comparing at least part of the obtained result to an answer known by the user or stored on a universal serial bus key or on a chip card.

46. The apparatus according to claim 42, wherein the processing hardware is further configured to verify of the authentication and encryption algorithms by running the hash function on these algorithms and comparing at least part of the obtained result to an answer known by the user or stored on a universal serial bus key or on a chip card.

47. The apparatus according to claim 35, wherein the authentication algorithm is the same as the encryption algorithm.

48. The apparatus according to claim 35, wherein the authentication algorithm is an asymmetric key algorithm and the encryption algorithm is a symmetric key algorithm.

49. The apparatus according to claim 35, wherein the processing hardware is further configured to download data from the server, the data being encrypted by using the session key and the encryption algorithm.

50. The apparatus of claim 35, wherein the processing hardware is configured to:
 receive additional user input for establishing the secured communication session with the server;

wherein said creating the session key and said obtaining the public key is performed in response to the additional user input.

\* \* \* \* \*

UNITED STATES PATENT AND TRADEMARK OFFICE
CERTIFICATE OF CORRECTION

| | | |
|---|---|---|
| PATENT NO. | : 8,601,267 B2 | Page 1 of 1 |
| APPLICATION NO. | : 13/647429 | |
| DATED | : December 3, 2013 | |
| INVENTOR(S) | : Thierry Lucidarme et al. | |

It is certified that error appears in the above-identified patent and that said Letters Patent is hereby corrected as shown below:

In the Claims:

Claim 42, Column 12, Lines 31-32, please delete "wherein the wherein the" and substitute -- wherein the --

Claim 46, Column 12, Line 46, please delete "of the" and substitute -- the --

Signed and Sealed this
Third Day of June, 2014

Michelle K. Lee
*Deputy Director of the United States Patent and Trademark Office*